United States Patent
Sveum et al.

(10) Patent No.: US 9,957,121 B2
(45) Date of Patent: May 1, 2018

(54) SAFETY SYSTEMS FOR VERTICALLY STORING DOCK LEVELERS

(71) Applicants: Matthew Sveum, Wauwatosa, WI (US); Timothy Muhl, Slinger, WI (US)

(72) Inventors: Matthew Sveum, Wauwatosa, WI (US); Timothy Muhl, Slinger, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 732 days.

(21) Appl. No.: 13/965,730

(22) Filed: Aug. 13, 2013

(65) Prior Publication Data

US 2015/0047132 A1 Feb. 19, 2015

(51) Int. Cl.
*B65G 69/28* (2006.01)

(52) U.S. Cl.
CPC ..... *B65G 69/2882* (2013.01); *B65G 69/2823* (2013.01)

(58) Field of Classification Search
CPC ............ B65G 69/2852; B65G 69/2876; B65G 69/2882
USPC ................................................. 14/71.1, 71.3
See application file for complete search history.

(56) References Cited

U.S. PATENT DOCUMENTS

| 4,977,635 A | 12/1990 | Alexander |
| 5,299,386 A | 4/1994 | Naegelli et al. |
| 5,396,676 A | 3/1995 | Alexander et al. |
| 5,586,355 A * | 12/1996 | Metz et al. ................... 14/69.5 |
| 6,502,268 B2 | 1/2003 | Ashelin et al. |
| 7,045,764 B2 * | 5/2006 | Beggs et al. .................. 250/221 |
| 7,380,375 B2 * | 6/2008 | Maly ............................. 52/173.1 |
| 7,954,606 B2 | 6/2011 | Tinone et al. |
| 8,424,254 B2 * | 4/2013 | Ballester ...................... 52/173.2 |

(Continued)

FOREIGN PATENT DOCUMENTS

WO 2009073001 6/2009

OTHER PUBLICATIONS

International Searching Authority, "The Written Opinion of the International Searching Authority," issued in connection with corresponding International Patent Application No. PCT/US2014/050716, dated Dec. 11, 2014 (7 pages).

(Continued)

*Primary Examiner* — Gary S Hartmann
(74) *Attorney, Agent, or Firm* — Hanley, Flight & Zimmerman, LLC

(57) ABSTRACT

Example dock leveler safety systems for vertically storing dock levelers are disclosed herein. An example dock leveler safety system disclosed herein may be used at a dock platform in a pit having a pit floor, where the pit floor is at a lower elevation than the dock platform and the dock platform and the pit floor define the pit. The dock leveler safety system comprises a deck to pivot relative to the dock platform between an upright position and a lowered position such that the deck extends farther over the pit floor when the deck is in the lowered position than when the deck is in the stored upright position. A sensor monitors a sensed region within the pit when the deck is in the upright position and the sensor provides a reaction signal in response to a body being detected within the sensed region. The deck enters a state of restricted movement in response to the reaction signal.

23 Claims, 14 Drawing Sheets

(56) References Cited

U.S. PATENT DOCUMENTS

| | | | |
|---|---|---|---|
| 8,547,234 B2* | 10/2013 | Maly et al. | 340/573.1 |
| 8,590,087 B2* | 11/2013 | Swessel et al. | 14/71.3 |
| 8,926,254 B2 | 1/2015 | Pocobello et al. | |
| 9,284,135 B2 | 3/2016 | Sveum et al. | |
| 2004/0075046 A1 | 4/2004 | Beggs et al. | |
| 2008/0141470 A1 | 6/2008 | Belongia | |
| 2008/0223667 A1 | 9/2008 | Tinone et al. | |
| 2009/0274542 A1* | 11/2009 | Pocobello et al. | 414/522 |
| 2010/0146719 A1 | 6/2010 | Swessel et al. | |
| 2012/0025964 A1* | 2/2012 | Beggs et al. | 340/435 |

OTHER PUBLICATIONS

International Searching Authority, "The International Search Report," issued in connection with corresponding International Patent Application No. PCT/US2014/050716, dated Dec. 11, 2014 (6 pages).

International Searching Authority, "The Written Opinion of the International Searching Authority," issued in connection with corresponding International Patent Application No. PCT/US2014/050721, dated Dec. 11, 2014 (8 pages).

International Searching Authority, "The International Search Report," issued in connection with corresponding International Patent Application No. PCT/US2014/050721, dated Dec. 11, 2014 (6 pages).

The United States Patent and Trademark Office, "Non-Final Office Action," issued in connection with U.S. Appl. No. 14/204,987, dated Jan. 14, 2015, 17 pages.

United States Patent and Trademark Office, "Notice of Allowance," issued in connection with U.S. Appl. No. 14/204,987, dated Nov. 5, 2015, 15 pages.

International Bureau, "International Preliminary Report on Patentability," issued in connection with Application No. PCT/US2014/050716, dated Feb. 16, 2016, 9 pages.

International Bureau, "International Preliminary Report on Patentability," issued in connection with Application No. PCT/US2014/050721, dated Feb. 16, 2016, 10 pages.

United States Patent and Trademark Office, "Non-Final Office Action," issued in connection with U.S. Appl. No. 14/204,987, dated Jun. 25, 2015, 7 pages.

\* cited by examiner

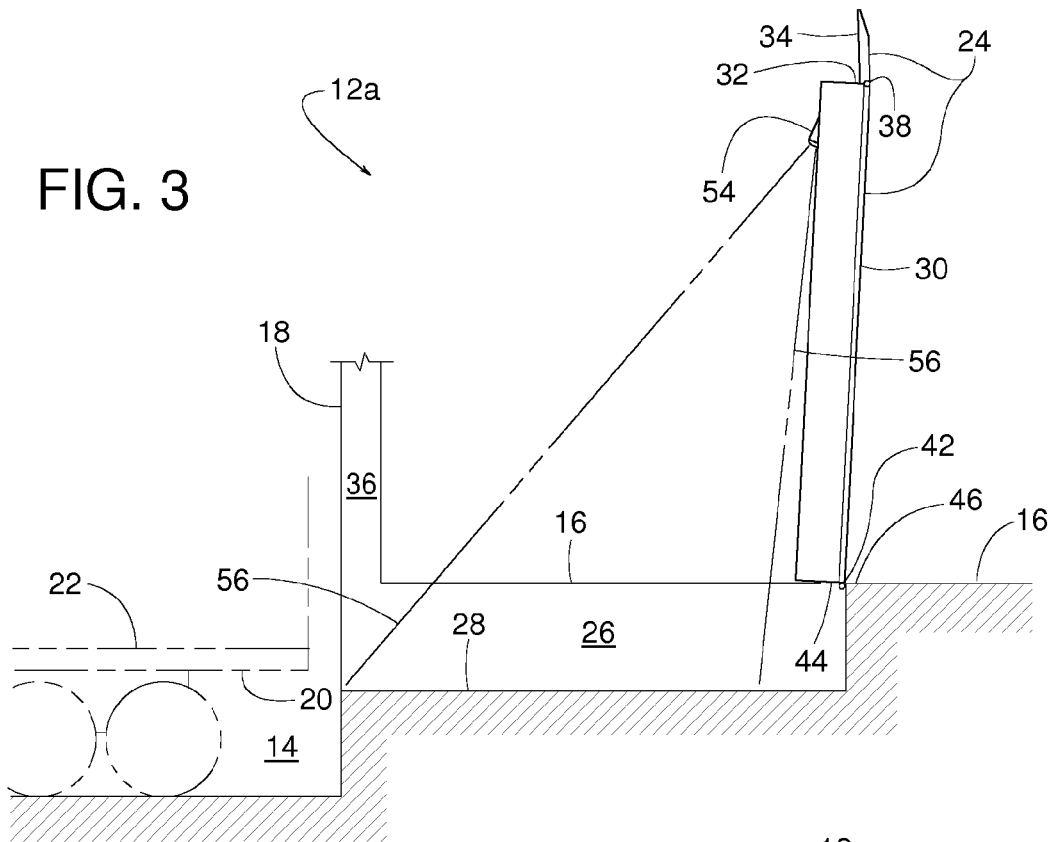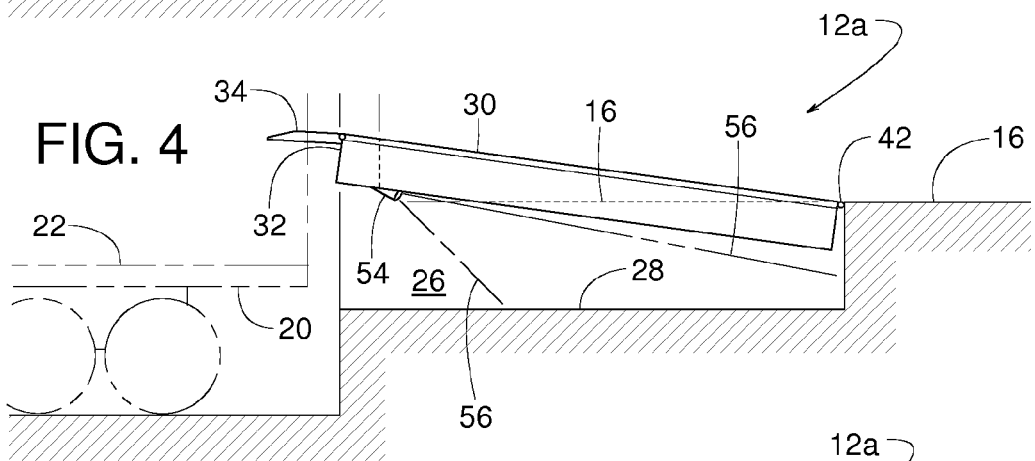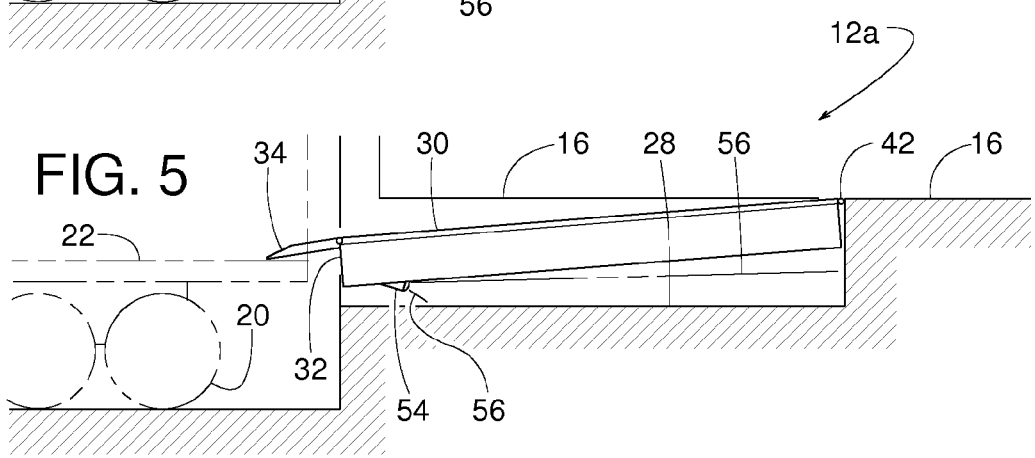

SAFETY SYSTEMS FOR VERTICALLY STORING DOCK LEVELERS

FIELD OF THE DISCLOSURE

The present disclosure relates generally to vertically storing dock levelers and, more specifically, to safety systems for vertically storing dock levelers.

BACKGROUND

A typical loading dock of a building includes an exterior doorway with an elevated platform for loading and unloading vehicles, such as trucks and trailers. To compensate for height differences between the loading dock platform and an adjacent bed of a truck or trailer, many loading docks have a dock leveler. A typical dock leveler includes a deck or ramp that is pivotally hinged along a rear edge to vary the height of a front edge of the deck. An extension plate or lip extends outward from the front edge of the deck to span a gap between a rear of a truck bed and the front edge of the deck. This allows personnel and material handling equipment to readily move on and off the vehicle during loading and unloading operations.

The deck is usually moveable between a stored position and an operative position. Depending on the style of dock leveler, the deck may store either vertically or horizontally. Vertically storing decks are usually driven by a hydraulic cylinder. The hydraulic cylinder typically extends to raise the deck to a vertically stored position and retracts as the deck descends to an operative position. The force for lowering the deck can be provided from the hydraulic action within the cylinder and/or the weight of the deck itself. In some cases, the weight of the deck urges the deck downward while a hydraulic flow restriction associated with the cylinder provides the deck with a controlled descent.

Vertically storing dock leveler offer important benefits over horizontal levelers. They offer better access to a pit floor for cleaning, which may be required in some industries. In addition, vertically storing dock levelers facilitate an environmental seal between the outside dock door and the dock floor.

BRIEF DESCRIPTION OF THE DRAWINGS

FIG. 3 is a right side view of FIG. 1.

FIG. 4 is a side view similar to FIG. 3 but showing a deck of the example dock leveler in a lowered position.

FIG. 5 is a side view similar to FIG. 4 but showing the example deck in another lowered position.

DETAILED DESCRIPTION

Figure 1:
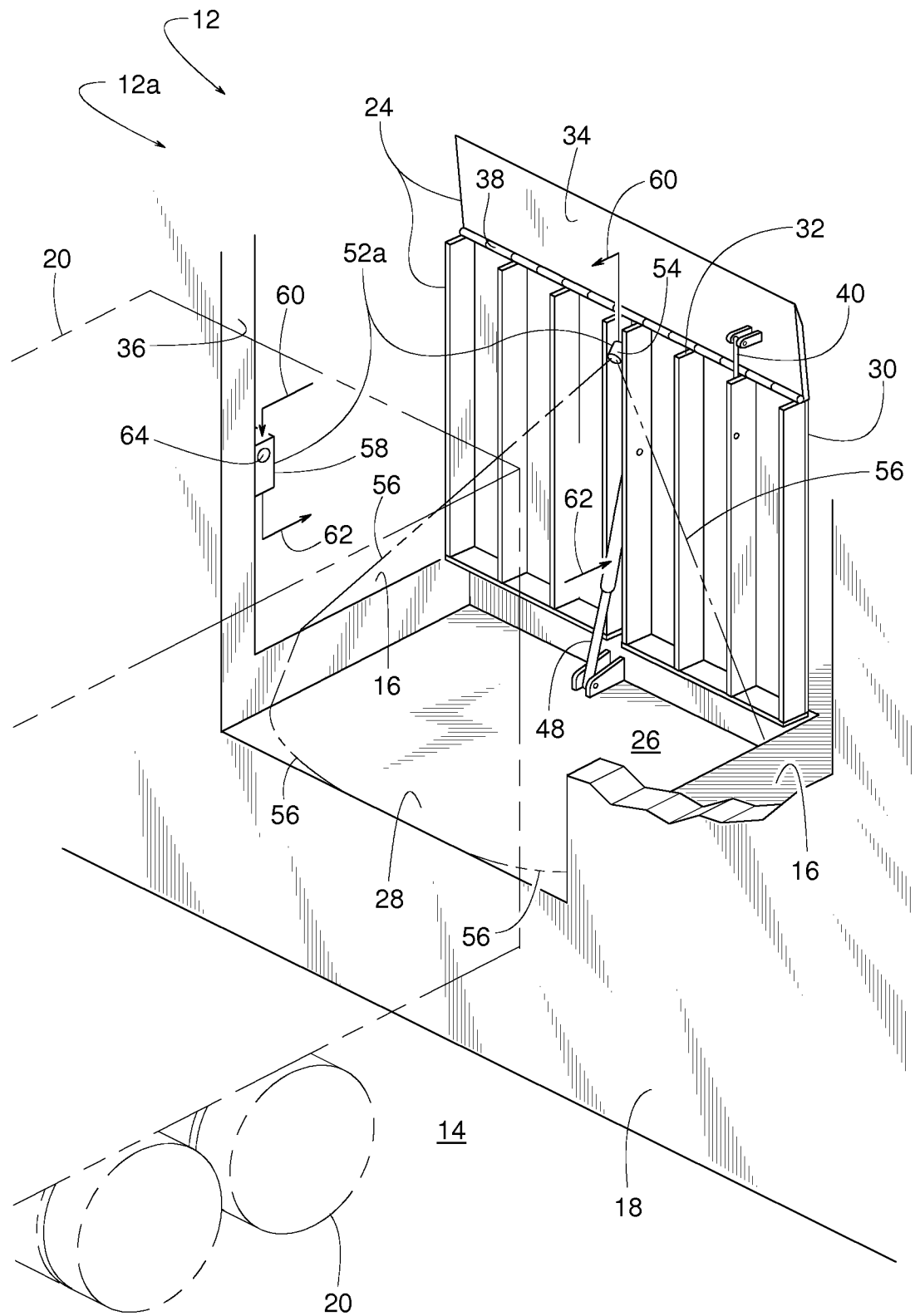
FIG. 1 is a partial cutaway perspective view of an example safety system for a vertically storing dock leveler constructed in accordance with the teachings disclosed herein.

To ensure safe operation of dock levelers having a deck that pivots between an upright position and a lowered operative position, example safety systems disclosed herein determine an absence or presence of an object or individual adjacent or near a deck when the deck descends to a lowered position. In some examples, an example sensor system disclosed herein surveys an area near a pit floor rather than monitoring just an area near the deck. In this way, the deck does not have to approach an object or individual in order to determine whether an individual is present. The absence or presence of an object or individual can be determined while the deck is in an upright position.

FIGS. 1-13 show example dock leveler safety systems 12 (e.g., safety systems 12a-f) used at a loading dock 14 for transferring cargo between a dock platform 16 of a building 18 and the open rear end of a vehicle 20, such as a truck or trailer. To compensate for a height difference that might exist between dock platform 16 and a floor 22 or trailer bed of vehicle 20, an example dock leveler 24 is installed within a pit 26, which extends from the upper surface of platform 16 down to a pit floor 28. In the illustrated example, dock leveler 24 has a deck 30 that can pivot between a generally upright stored position (e.g., as shown in FIGS. 1-3 and 6-10) and select lowered positions of various heights (e.g., as shown in FIGS. 4 and 5). The various lowered positions serve to vertically align a front edge 32 of deck 30 to the approximate height of the vehicle's floor 22. In some examples, a lip 34 extends from deck 30 to span a gap between the deck's front edge 32 and the rear edge of vehicle 20. When deployed, deck 30 and lip 34 provide a bridge or ramp across which material handling equipment and personnel can travel through a doorway 36 between dock platform 16 and vehicle 20.

In some examples, a hinge 38 pivotally connects lip 34 to deck 30, and a lip actuator 40 pivots lip 34 between an extended position (as shown in FIGS. 1-10) and a pendant position (not shown) where lip 34 lies generally perpendicular to deck 30. Examples of lip actuator 40 include, but are not limited to, a hydraulic cylinder, a pneumatic cylinder, a linear motor, a manual actuator, an inflatable diaphragm, a winch, a hoist, a spring, and various combinations thereof. In some examples, lip 34 translates rather than pivots relative to deck 30. In some examples, lip 34 is stationary relative to deck 30. In some examples, dock leveler 24 does not include lip 34.

Figure 2:
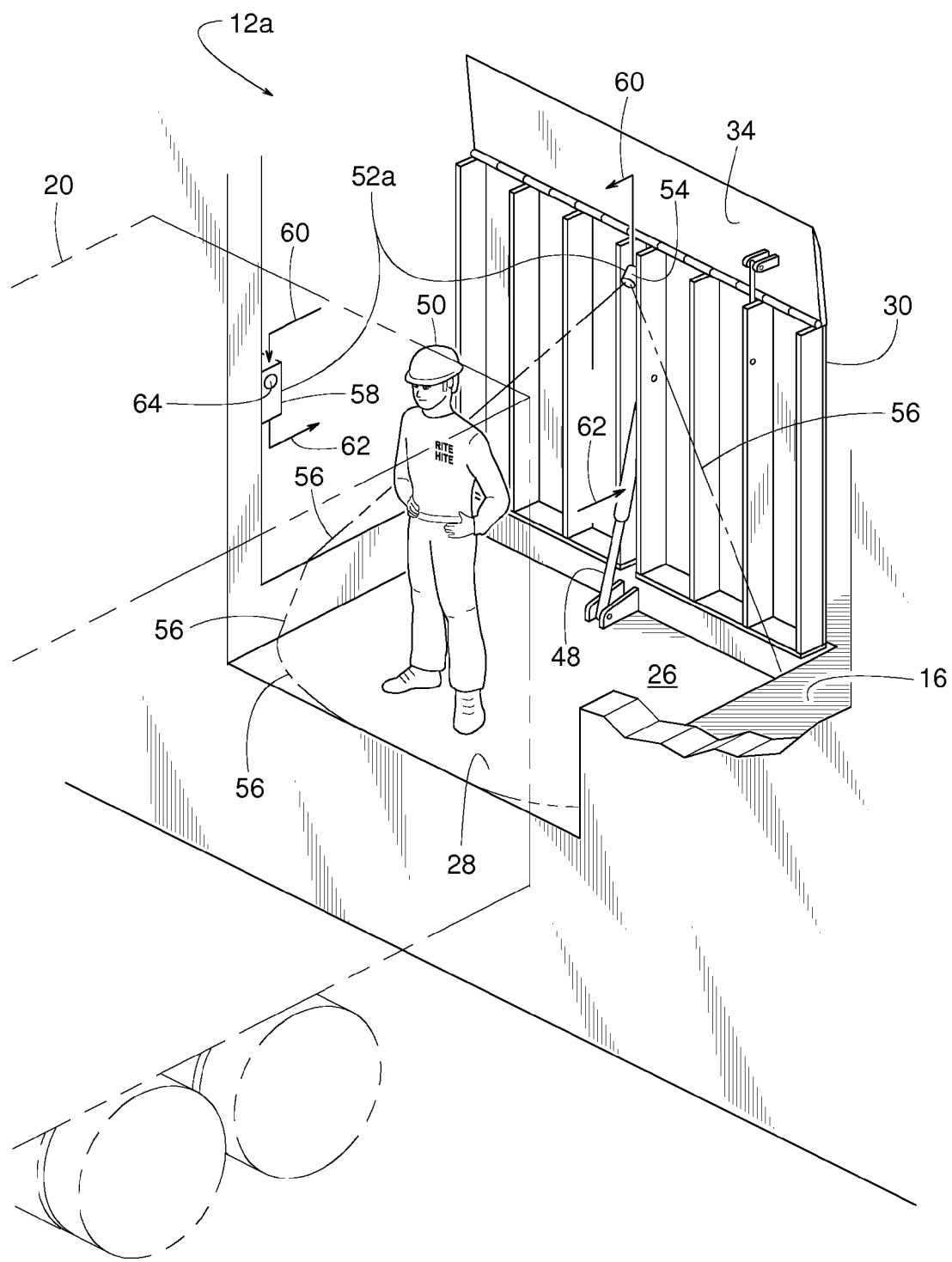
FIG. 2 is a perspective view similar to FIG. 1 but showing a person located in a pit of the example dock leveler of FIG. 1.

In the illustrated example, a rear hinge 42 (FIGS. 3-5) pivotally connects a rear edge 44 of deck 30 to an upper edge 46 of dock platform 16, and a deck actuator 48 pivots deck 30 between the stored upright position and a lowered position. Examples of deck actuator 48 include, but are not limited to, a hydraulic cylinder, a pneumatic cylinder, a linear motor, an inflatable diaphragm, a winch, a hoist, a spring, and/or various combinations thereof. FIGS. 4 and 5 show deck 30 being moveable over a range of operative positions, and FIGS. 1-3 show deck 30 outside of (e.g., above) the range of operative positions. In some lowered positions, as shown in FIG. 5, lip 34 rests upon the vehicle's floor 22 to provide a smooth transition for material handling equipment to travel between deck 30 and vehicle 20.

Referring to FIG. 2, to prevent deck 30 from accidentally lowering against a body 50 (such as a worker standing on pit floor 28) within pit 26, the example dock lever 24 of the illustrated example employs a safety system 12a. The safety system 12a of the illustrated example includes a sensor system 52a for detecting the presence or movement of body 50 in the area of pit 26. In the example illustrated in FIGS. 1-5, sensor system 52a includes a sensor 54 attached to an underside of deck 30. Sensor 54 may be implemented by illustrated to represent any device capable of detecting the presence and/or motion of a body 50 within a sensed region or area. Examples of such sensors include, but are not limited to, photoelectric eyes, proximity sensors, motion detectors for sensing moving bodies, and/or body sensors for detecting stationary bodies. Some such sensors operate under various principles including, but not limited to, ultrasonics, active and/or passive detection of infrared radiation, visible light detection, laser detection, detection of electromagnetic radiation (including sensing radio waves or sensing changes in capacitance or inductance), detection of a Doppler shift in microwaves, etc.

In the illustrated example, sensor system 52a provides a sensed region 56 that projects in at least a portion of an area defined by pit 26. In some examples, as shown in FIGS. 3-5, sensed region 56 decreases in size as deck 30 descends from the stored upright position (FIG. 3) to the lowered position (e.g., the lowered positions shown in FIG. 4 or 5). In some examples, the sensed region 56 decrease in size can effectively deactivate or diminish the function of sensor system 52a when deck 30 is operating within the range of operative positions such as, for example, the positions shown in FIGS. 4 and 5. In some examples, sensor system 52a includes a logic circuit or controller 58 (e.g., a semiconductor (i.e., a non-carbon) based processor, programmable logic controller, etc.) for distinguishing unexpected movement of body 50 and normal movement of sensor 54 relative to pit floor 26 as deck 30 descends to the lowered position. All or part of logic circuit/controller 58 and/or associated electrical enclosures (e.g., junction boxes) can be installed at any location (e.g., proximate or remote locations) relative to the dock leveler 30 and/or the sensor 54.

In response to sensor system 52a detecting body 50 moving or being present within sensed region 56, sensor system 52a provides a reaction signal 60 that controller 58 receives as input. Upon receiving reaction signal 60, controller 58 provides an output 62 that commands deck 30 to a state of restricted movement. In some examples, the state of restricted movement means that output 62 commands deck actuator 48 to hold deck 30 substantially stationary. In other words, the state of restricted movement is a state in which the deck actuator 48 prevents or restricts upward and/or downward movement of deck 30. In some examples, entry into the state of restricted movement causes that output 62 to command deck actuator 48 to drive deck 30 to the stored upright position. In some examples, entry into the state of restricted movement causes output 62 to prevent deck actuator 48 from lowering deck 30 but allows deck actuator 48 to raise deck 30. In other words, upward movement of deck 30 is enabled, but downward movement of deck 30 is generally prevented or restricted. In some examples, reaction signal 62 also triggers controller 58 to emit an alarm signal 64 (e.g., an audible alarm or a visual alarm).

In some examples, once deck 30 is operating within the range of operative positions, as shown in FIGS. 4 and 5, reaction signal 60 is disregarded or disabled to allow deck 30 to function in a state of normal operation. In this manner, false signals triggered by sensor 54 being proximate pit floor 28 do not interfere with normal operation of dock leveler 24.

Figure 6:
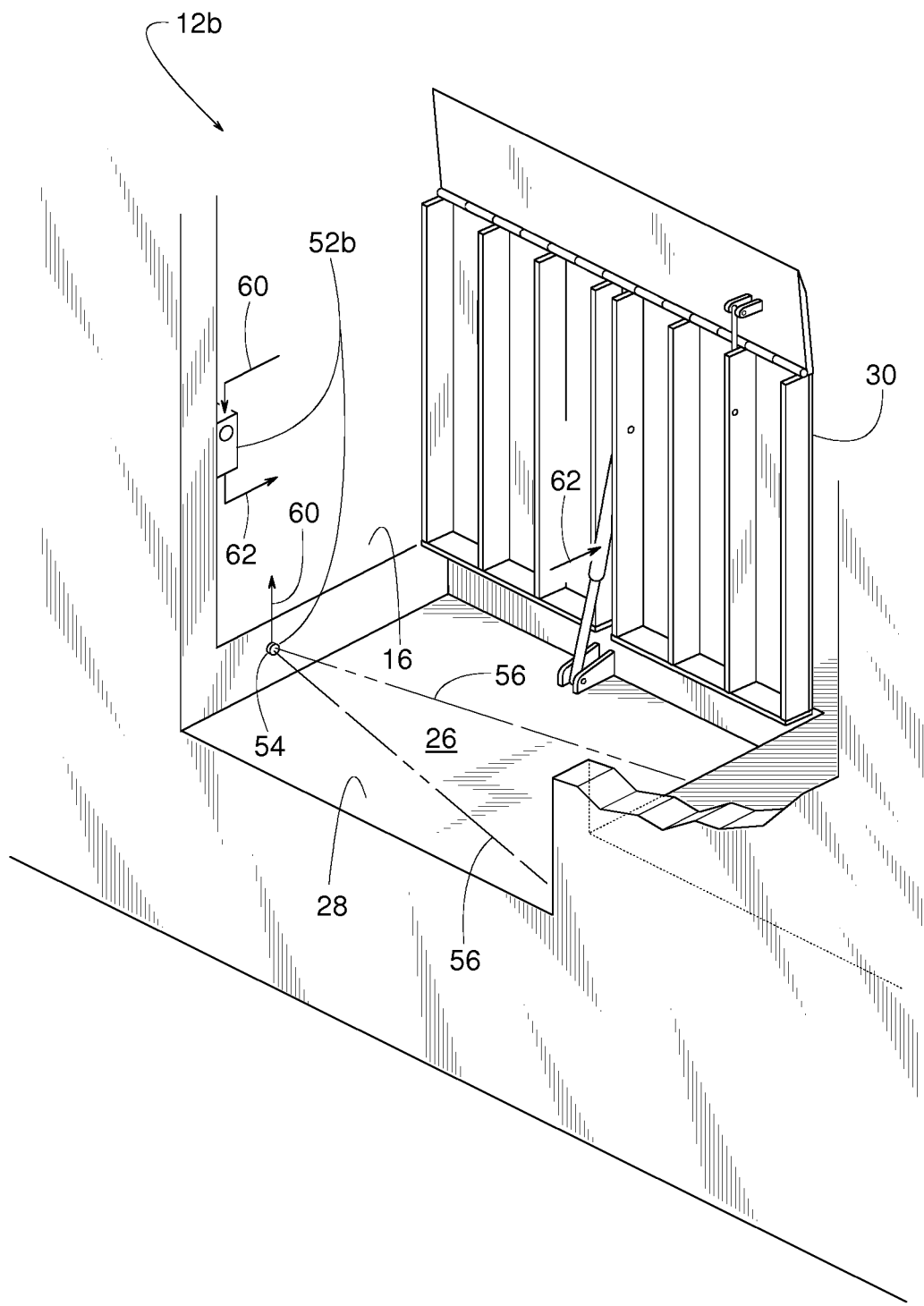
FIG. 6 is a partial cutaway perspective view of another example safety system for a vertically storing dock leveler constructed in accordance with the teachings disclosed herein.

FIG. 6 shows another example safety system 12b disclosed herein. The example safety system 12b has a sensor system 52b that includes sensor 54 (e.g., a body sensor for detecting the presence of body 50, and/or a motion detector for sensing movement of body 50) installed at a location (e.g., fixed to a structure that is stationary relative to the dock leveler 24). The sensed region 56 of the illustrated example is projected in an area of pit 26 adjacent the pit floor 28. In this example, sensor 54 and sensed region 56 remain substantially stationary as deck 30 moves between the stored upright position and the lowered position. Sensor 54 provides reaction signal 60 in response to sensing the presence or movement of body 50 within sensed region 56. Reaction signal 60 is used in the same or similar manner as used in safety system 12a.

Figure 7:
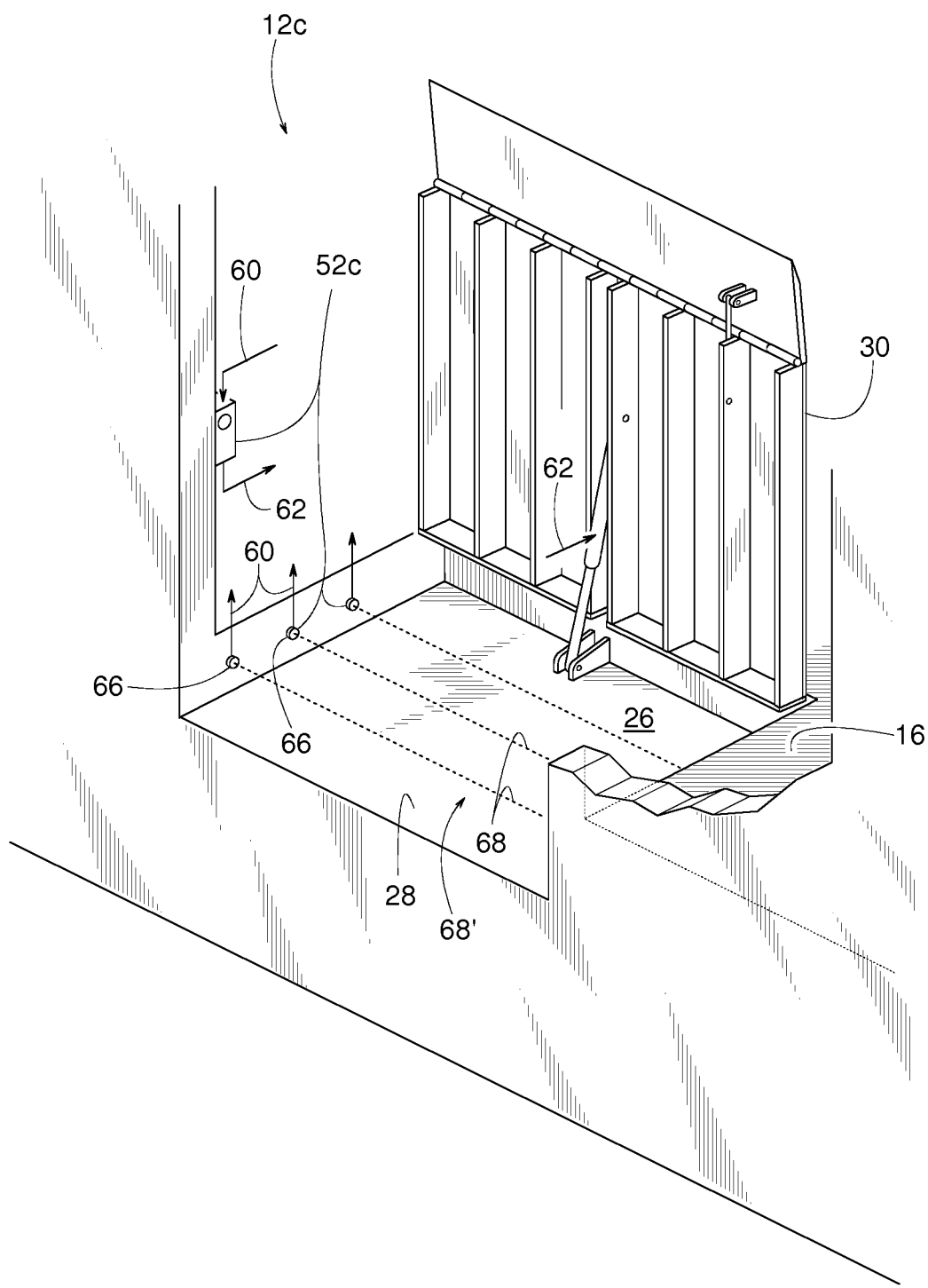
FIG. 7 is a partial cutaway perspective view of another example safety system for a vertically storing dock leveler constructed in accordance with the teachings disclosed herein.

FIG. 7 shows another example safety system 12c disclosed herein. The example safety system 12c has a sensor system 52c that includes a plurality of sensors 66 installed at stationary locations within or near pit 26. Each sensor 66 emits a beam 68 at least partially across pit 26. Examples of sensors 66 include, but are not limited to, photoelectric eyes, proximity sensors, motion detectors for sensing moving bodies, and/or body sensors for detecting stationary bodies. Sensors suitable for some implementations include devices that operate under various principles including, but not limited to, ultrasonics, active and/or passive detection of infrared radiation, visible light detection, laser detection, etc. In some examples, beam 68 is a thru-beam passing from an emitter to a receiver, directly or reflected. Each sensor 66 provides reaction signal 60 in response to sensing the presence or movement of body 50 within a sensed region 68' within the pit 26 and/or adjacent the pit floor 28. Reaction signal 60 is used in the same or similar manner as used in safety system 12a.

Figure 8:
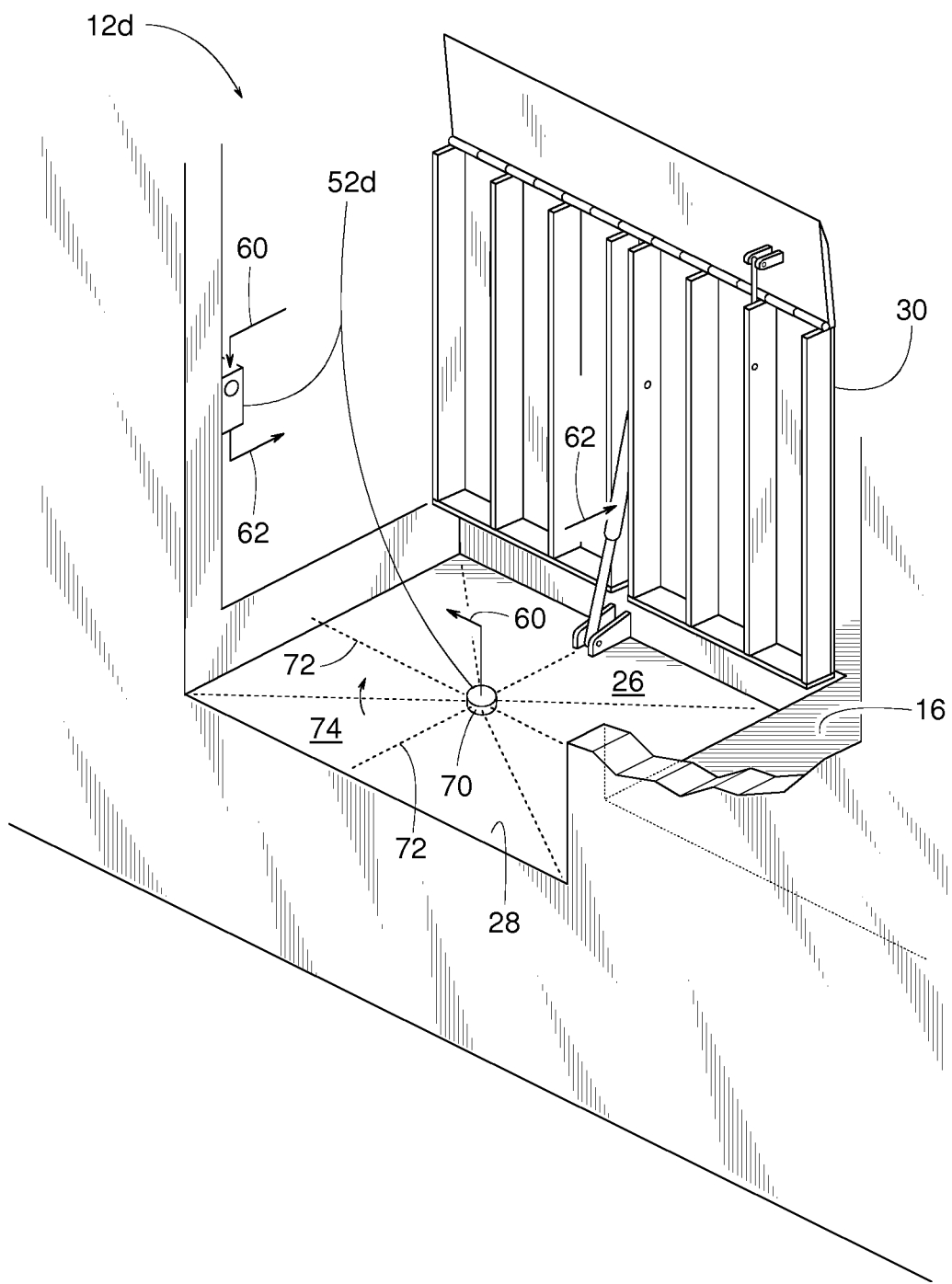
FIG. 8 is a partial cutaway perspective view of another example safety system for a vertically storing dock leveler constructed in accordance with the teachings disclosed herein.

FIG. 8 shows another safety system 12d disclosed herein. The example safety system 12d has a sensor system 52d that includes a sensor 70 in the form of a laser scanner fixed at a location within pit 26 so as not to move during operation. Sensor 70 emits rotating or radial beams 72 that scan or monitor a sensed region 74 adjacent (e.g., just above) pit floor 28. Sensor 70 provides the advantage of not requiring any retro-reflective material to outline a perimeter of pit 26. Sensor 70 provides reaction signal 60 in response to sensing the presence of body 50 within sensed region 74. Reaction signal 60 is used in the same or similar manner as used in safety system 12a.

Figure 9:
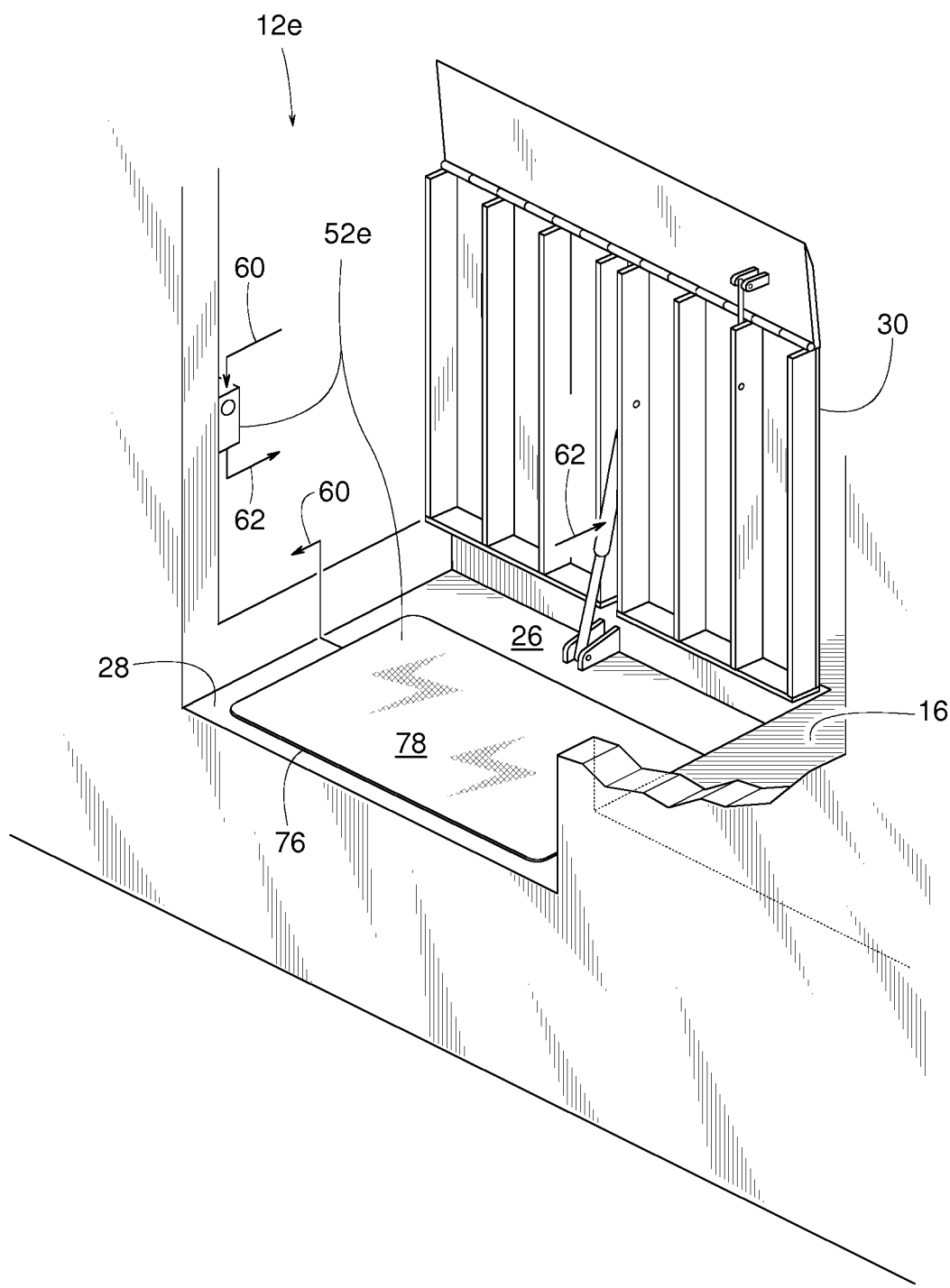
FIG. 9 is a partial cutaway perspective view of another example safety system for a vertically storing dock leveler constructed in accordance with the teachings disclosed herein.

FIG. 9 shows another example safety system 12e disclosed herein. The example safety system 12e has a sensor system 52e that includes a sensor 76 in the form of a pressure sensitive mat positioned on at least a portion of pit floor 28 that provides or defines a sensed region 78. The weight of body 50 on the pressure sensitive mat closes electrical contacts within sensor 76 to produce reaction signal 60. Reaction signal 60 is used in the same or similar manner as used in safety system 12a.

Figure 10:
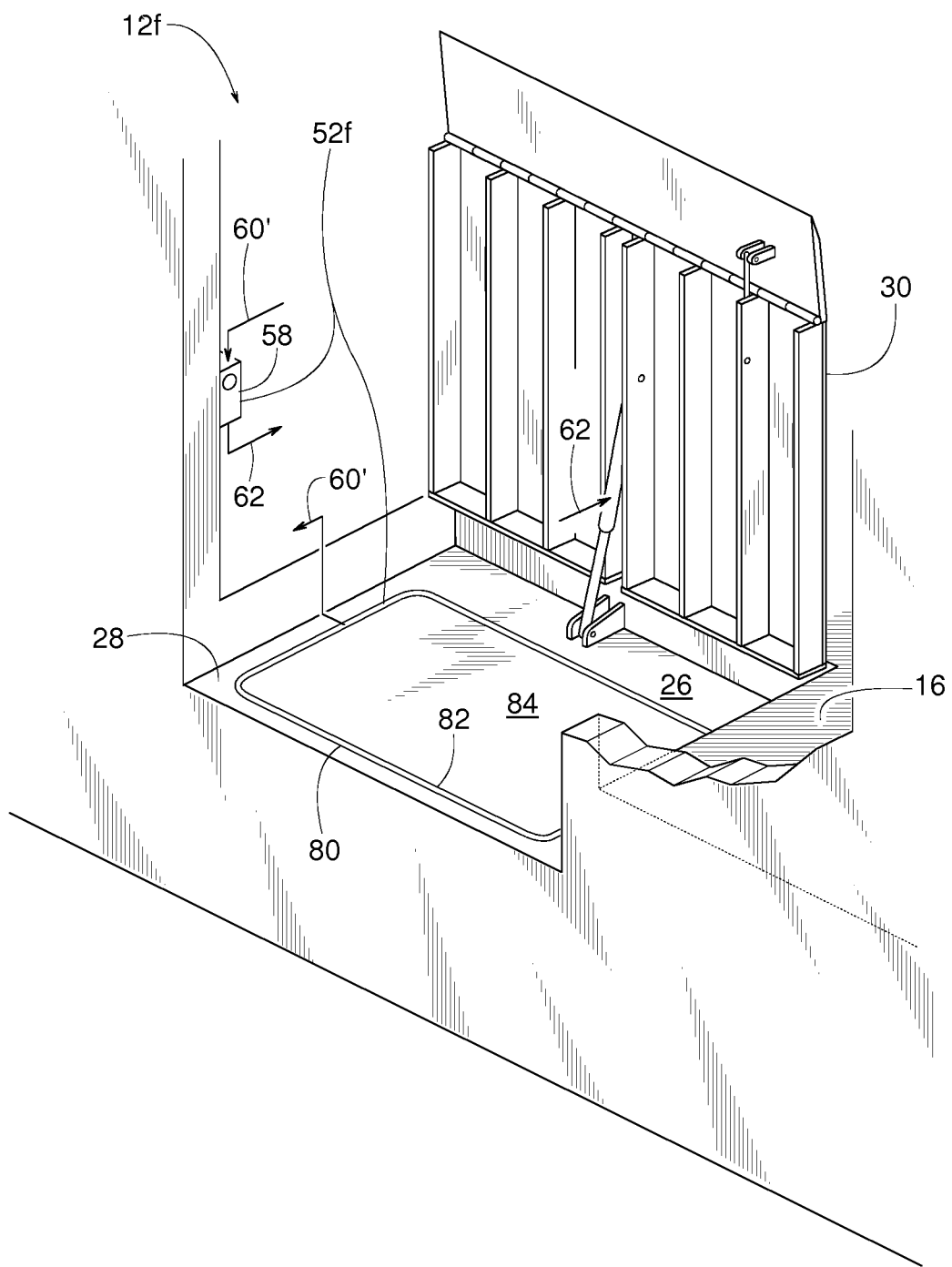
FIG. 10 is a partial cutaway perspective view of another example safety system for a vertically storing dock leveler constructed in accordance with the teachings disclosed herein.

FIG. 10 shows another example safety system 12f disclosed herein. The example safety system 12f of the illustrated example has a sensor system 52f that includes a sensor 80 in the form of an induction loop or antenna 82 encircling pit 26 to provide a sensed region 84 within pit 26. In some examples, antenna 82 is embedded within the floor or sidewalls of pit 26. Antenna 82 carries an oscillating signal of a nominal frequency to generate a magnetic field around antenna 82. When body 50 disturbs the magnetic field by altering the capacitive coupling between antenna 82 and ground, the oscillating signal within antenna 82 oscillates at a different frequency (e.g., a frequency that is lower) relative to a nominal frequency. A change (e.g., a drop) in frequency can be used to identify that body 50 is within sensed region 84. In this example, reaction signal 60 is the change in oscillating frequency. When the presence of body 50 disturbs the electromagnetic field around antenna 82, controller 58 reacts to a reaction signal 60' in a manner similar or identical to safety system 12a.

Figure 11:
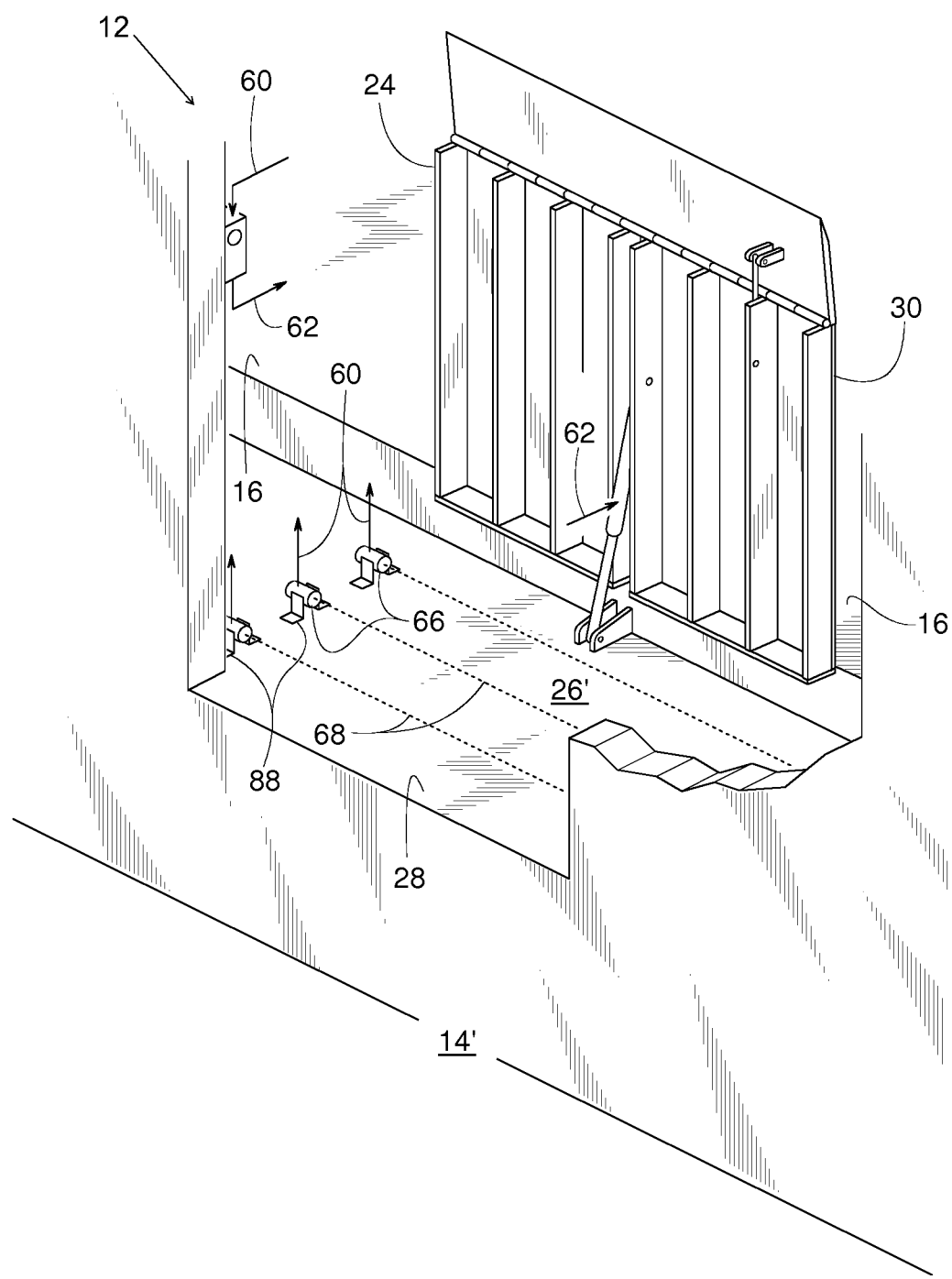
FIG. 11 is a partial cutaway perspective view of another example safety system for a vertically storing dock leveler constructed in accordance with the teachings disclosed herein.
Figure 12:
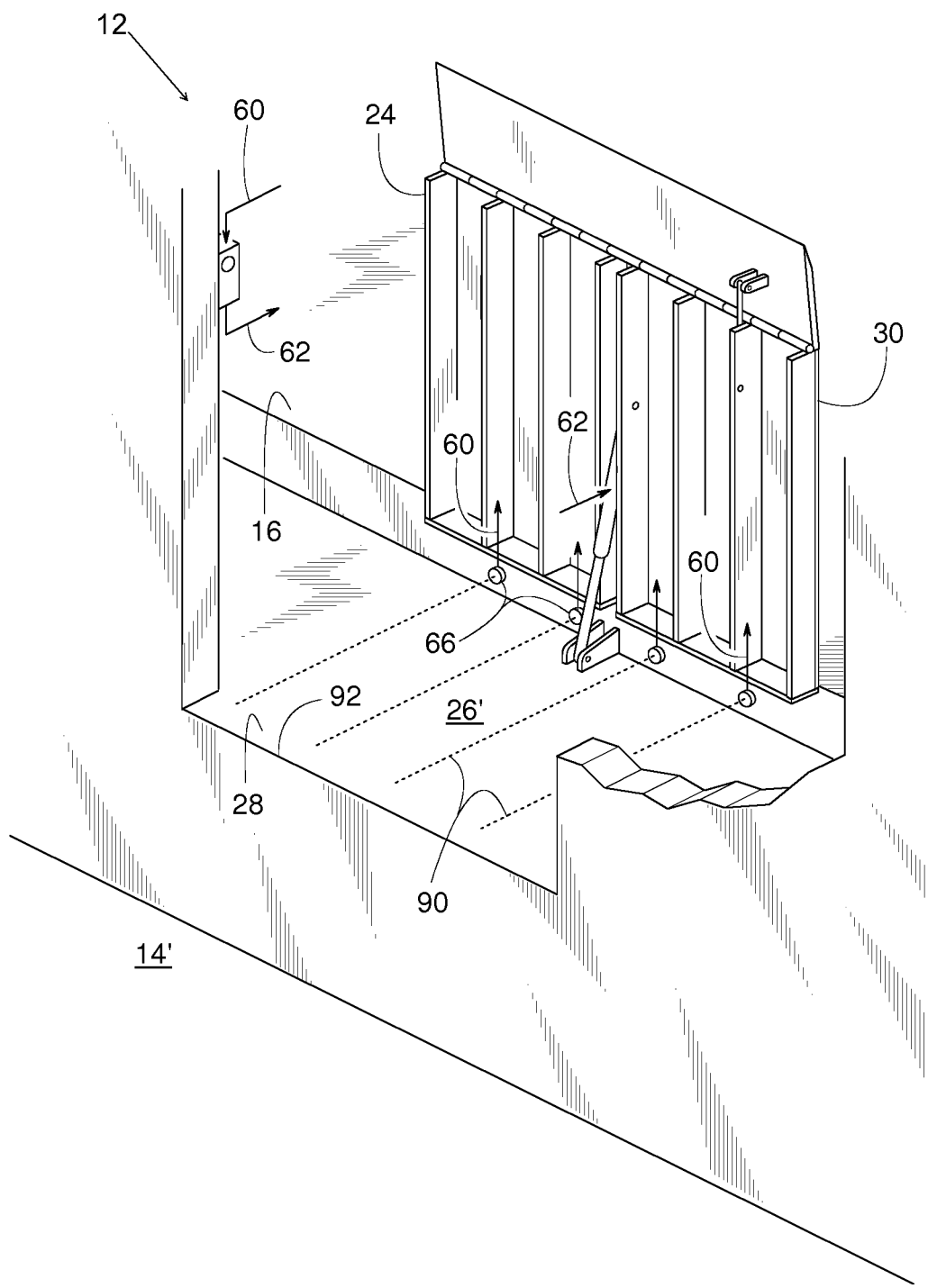
FIG. 12 is a partial cutaway perspective view of another example safety system for a vertically storing dock leveler constructed in accordance with the teachings disclosed herein.
Figure 13:
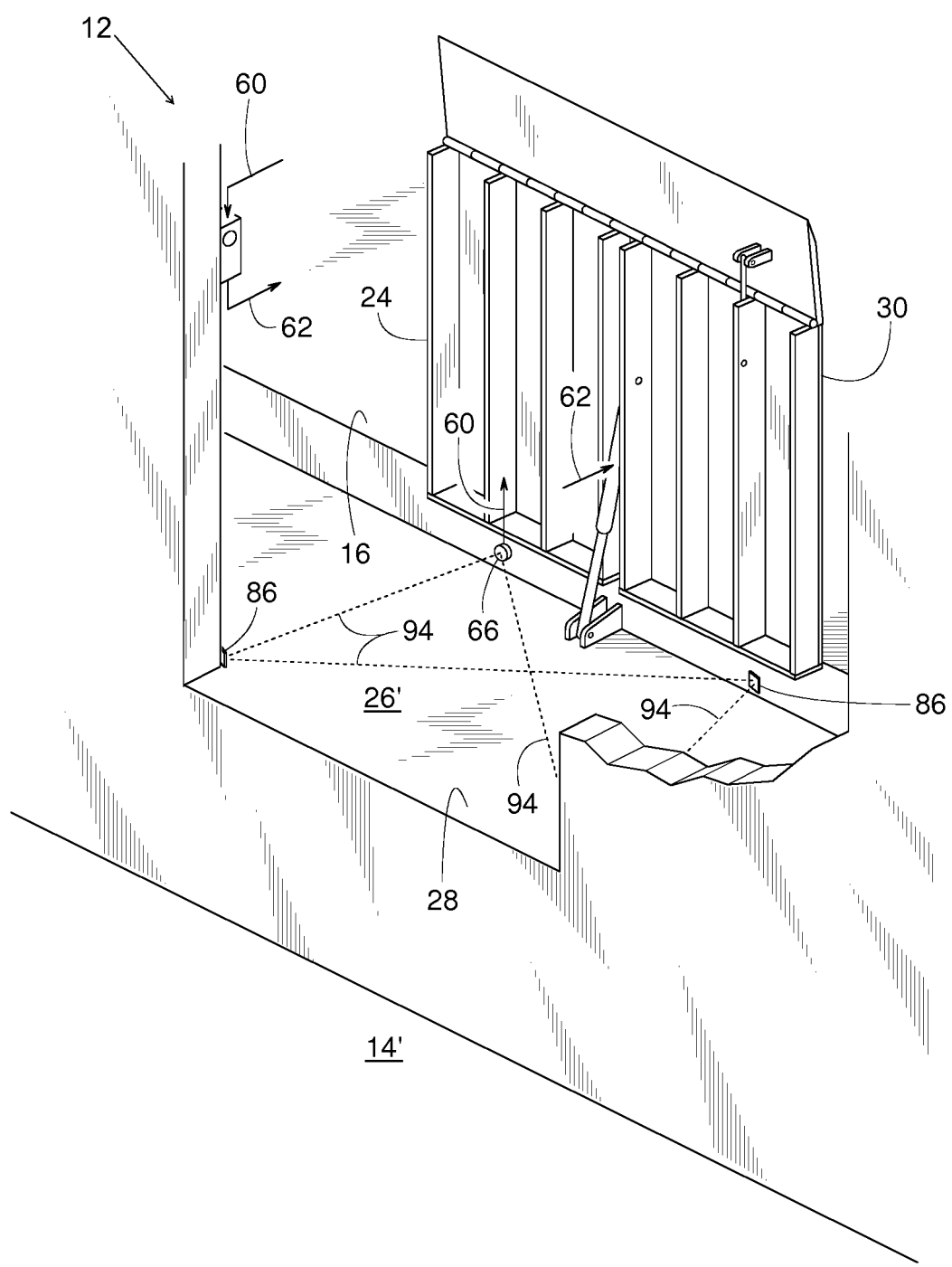
FIG. 13 is a partial cutaway perspective view of another example safety system for a vertically storing dock leveler constructed in accordance with the teachings disclosed herein.

FIGS. 11-13 show an example loading dock 14' having a pit 26' with an extended width so that multiple dock levelers 24 can be installed side-by-side within the same pit 26'. FIGS. 11-13 also show example safety systems 12 having sensors 66 can be installed in various arrangements to create a large (e.g., an infinite) variety of beam patterns, examples of which include, but are not limited to, a single beam pointed in any direction, a plurality of beams projected in various directions, a plurality of parallel beams projected in a forward direction, a plurality of beams projected in a rearward direction, a plurality of beams projected sideways (e.g., FIGS. 7 and 11), one or more beams projected in a cross-hatched pattern, one or more beams projected in an X-pattern, one or more beams projected in a Z-pattern, and/or various combinations thereof. In some examples, one or more mirrors 86 (e.g., FIG. 13) are used for creating a desired beam pattern.

In the example shown in FIG. 11, brackets 88 are used for mounting sensors 66 to pit floor 28 such that sensors 66 project beams 68 in a pattern similar to the pattern shown in FIG. 7. FIG. 12 shows sensor 66 projecting beams 90 in a forward direction relative to the dock wall 18. In some examples of FIG. 12, a series of reflectors or targets are installed along a front edge 92 of pit 26', and in other examples of FIG. 12, sensors 66 function without the need for such reflectors or targets. FIG. 13 shows sensor 66 with a plurality of mirrors 86 for projecting beam 94 in an X-pattern.

For further clarification, the term, "stored upright position," does not necessarily mean that deck 30 is perfectly vertical in the stored upright position. Rather, the stored upright position means that deck 30 in that position is closer to being vertical than horizontal. Dock platform 16 and pit floor 28 defining pit 26 therebetween means that pit 26 is at an elevation between the elevation of the dock platform 16 and the elevation of pit floor 28. Dock platform 16 and pit floor 28 defining pit 26' therebetween means that pit 26' is at an elevation between the elevation of the dock platform 16 and the elevation of pit floor 28. In some examples, various structure steel angles, channels, bar stock and/or plates line various edges and surfaces of pit 26, pit 26', dock platform 16, and pit floor 28. For instance, in some examples, a steel channel is between rear hinge 42 and the dock platform's upper edge 46. A sensor system having a sensed region within a pit means that at least some of the sensed region is within the pit. An induction loop (e.g., an antenna) being proximate the pit means that the induction loop is sufficiently close to the pit to detect a body within the pit.

Figure 14:
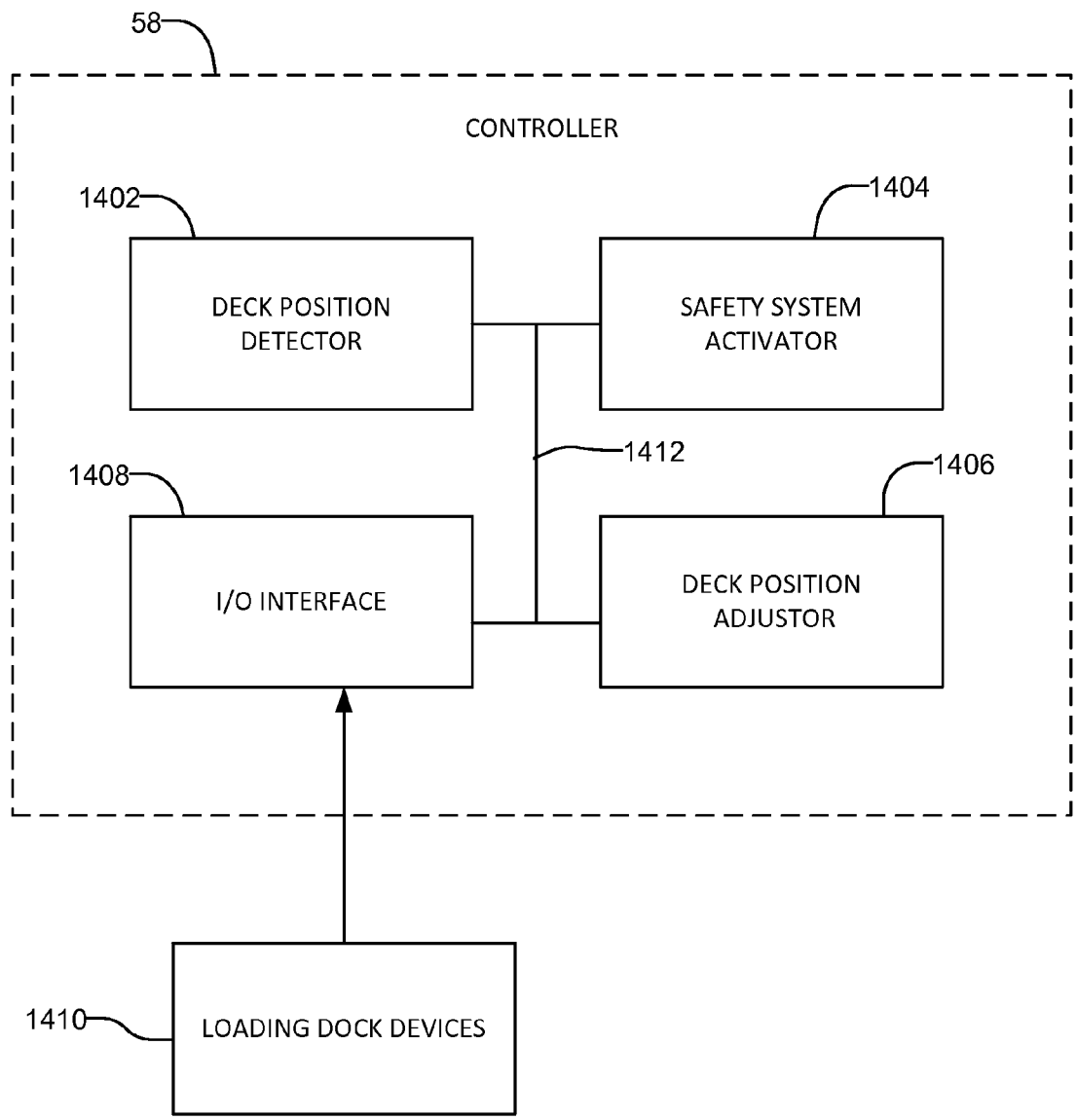
FIG. 14 is a block diagram representative of an example implementation of the example controller of FIGS. 1-13.

FIG. 14 is a block diagram of an example implementation of the example controller 58 of FIGS. 1-13. In the illustrated example, the controller 58 includes a deck position detector 1402, a safety system activator 1404, a deck position adjustor 1406, and an input/output interface 1408. The deck position detector 1402, the safety system activator 1404, the deck position detector 1406 and the input/output interface 1408 of the illustrated example are in communication via a communication bus 1412. The input/output interface 1408 of the illustrated example communicatively couples the example controller 58 to one or more loading dock devices 1410 such as, for example, one or more of the example sensors 54, 66, 70, 76, 80, the example lip actuator 40, the example deck actuator 48, a sensor to detect a position (e.g., the upright position or the lowered operative position) of the deck 30, and/or any other device that may be used in conjunction with the example loading dock leveler 24 of FIGS. 1-13.

Based on the signal received via the input/output interface 1408, the deck position detector 1402 of the illustrated example determines a state or position of one or more of the loading dock devices 1410 such as, for example, the position of the deck 30. In some examples, the deck position detector 1402 determines if the deck actuator 48 is in an extended state (e.g., which may correlate to the example deck 30 being in the upright position) or a retracted state (e.g., which may correlate to the example deck 30 being in one of the lowered positions of FIG. 4 or 5). For example, the deck position detector 1402 of the illustrated example receives a signal from a sensor coupled to the example deck actuator 48 and/or the deck 30 via the input/output interface 1408 that is indicative of the position of the example deck 30.

The deck position detector 1402 of the illustrated example communicates the position of the example deck 30 to the safety system activator 1404 and/or the deck position adjustor 1406. In turn, for example, the safety system activator 1404 of the illustrated example activates or deactivates the example safety systems 12 of FIGS. 1-13 based on the position of the example deck 30 detected by the deck position detector 1402. For example, when the deck position detector 1402 determines that the example deck 30 is in the upright position, the safety system activator 1404 of the illustrated example actives the example safety system 12 of FIGS. 1-13.

In some examples, the safety system activator 1404 receives and/or analyzes signals (e.g., the reaction signal 60) provided by the example sensors 54, 66, 70, 76 and 80 to determine or detect the presence and/or absence of the body 50 in the example sensed region 56, 68, 68', 74, 78, 84, 90, 94 of the example pit 26, 26'. For example, the safety system activator 1404 of the illustrated example analyzes the example reaction signal 60 and commands the deck position adjustor 1406 to adjust the position of the example deck 30 based on the detected reaction signal 60. For example, in response to the example safety system activator 1404 receiving the reaction signal 60, the deck position adjustor 1406 of the illustrated example causes the example deck actuator 48 to move to an extended position (e.g., to move the example deck 30 toward the upright position). In some examples, the deck position adjustor 1406 of the illustrated example holds the position of the deck 30 in response to the example safety system activator 1404 receiving the example reaction signal 60.

While an example manner of implementing the controller 58 of FIGS. 1-13 is illustrated in FIG. 14, one or more of the elements, processes and/or devices illustrated in FIG. 14 may be combined, divided, re-arranged, omitted, eliminated and/or implemented in any other way. Further, the example deck position detector 1402, the example safety system activator 1404, the example deck position adjustor 1406 and/or, more generally, the example controller 58 of FIG. 14 may be implemented by hardware, software, firmware and/or any combination of hardware, software and/or firmware. Thus, for example, any of the example the example deck position detector 1402, the example safety system activator 1404, the example deck position adjustor 1406 and/or, more generally, the example controller 58 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example deck position detector 1402, the example safety system activator 1404 and the example deck position adjustor 1406 are hereby expressly defined to include a tangible computer readable storage device or storage disk such as a memory, a digital versatile disk (DVD), a compact disk (CD), a Blu-ray disk, etc. storing the software and/or firmware. Further still, the example controller 58 may include one or more elements, processes and/or devices in addition to, or instead of, those illustrated in FIG. 14, and/or may include more than one of any or all of the illustrated elements, processes and devices.

Figure 15:
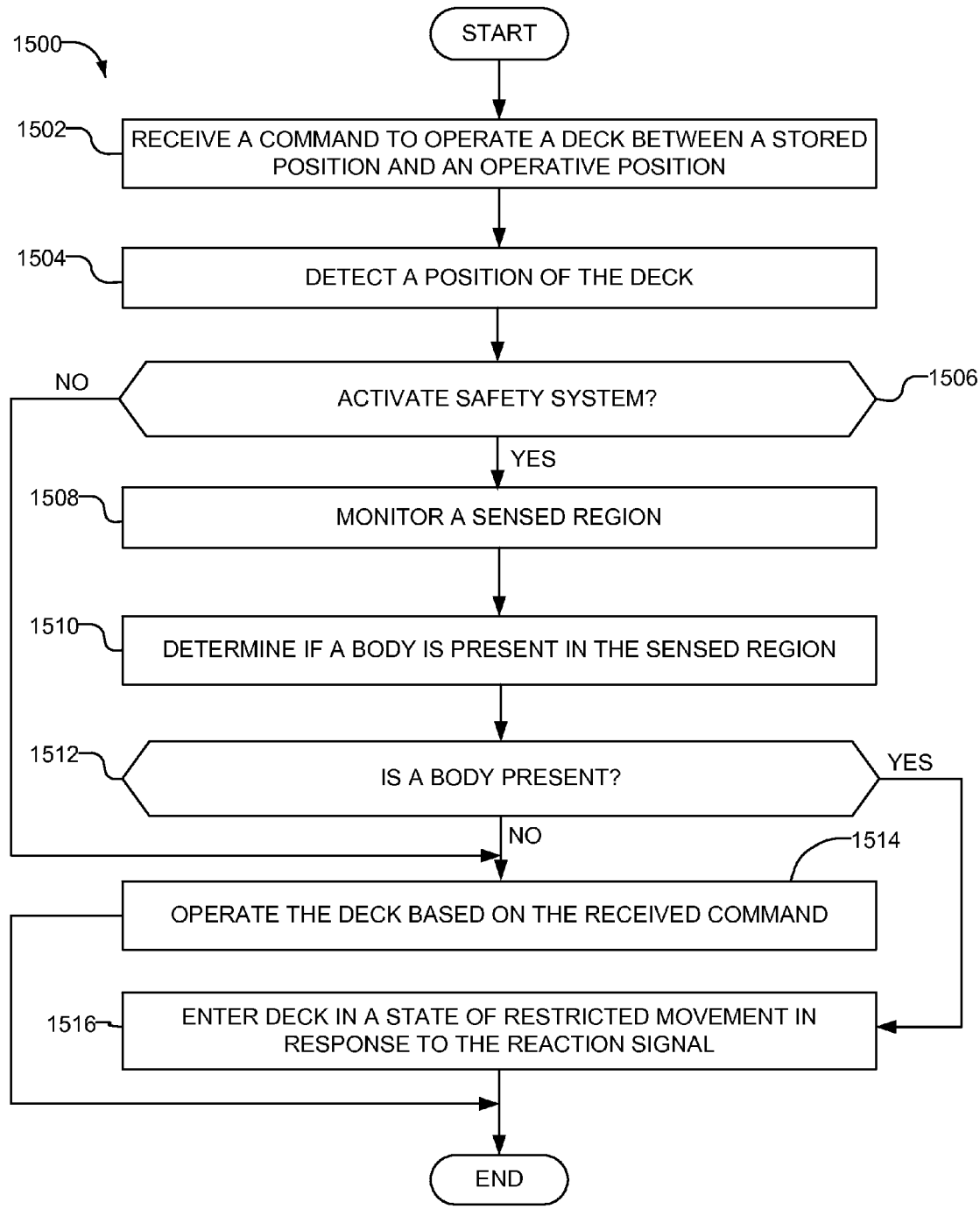
FIG. 15 is a flowchart representative of example machine readable instructions which may be executed to implement the example controller of FIG. 14.

A flowchart representative of example machine readable instructions for implementing the example controller 58 of FIG. 14 is shown in FIG. 15. In this example, the machine readable instructions comprise a program for execution by a processor such as the processor 1612 shown in the example processor platform 1600 discussed below in connection with FIG. 16. The program may be embodied in software stored on a tangible computer readable storage medium such as a CD-ROM, a floppy disk, a hard drive, a digital versatile disk (DVD), a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowchart illustrated in FIG. 15, many other methods of implementing the example controller 58 may alternatively be used. For example, the order of execution of the blocks may be changed, and/or some of the blocks described may be changed, eliminated, or combined.

As mentioned above, the example processes of FIG. 15 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIG. 15 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The program 1500 of FIG. 15 begins at block 1502 when the deck position adjustor 1406 of the illustrated example receives a command to operate the example deck 30 between the upright position and the lowered position. Prior to the deck position adjustor 1406 moving the deck 30 based on the received command, the deck position detector 1402 of the illustrated example detects a position (e.g., a current position) of the example deck 30 (block 1504). Specifically, the deck position detector 1402 of the illustrated example detects whether the example deck 30 is in an upright position or a lowered position to determine if the safety system 12 should be activated (block 1506). For example, if the deck position detector 1402 of the illustrated example determines that the example deck 30 is in a lowered or operative position, the deck position detector 1402 communicates the position of the example deck 30 to the safety system activator 1404. The safety system activator 1404, for example, deactivates or disables the example safety system 12 of the example dock leveler 24 and/or ignores a signal (e.g., the example reactive signal 60) provided by the sensors 54, 66, 70, 76, 80 of the example safety system 12 when the example deck position detector 1402 detects that the deck 30 is in a lowered or operative position. If the safety system activator 1404 of the illustrated example determines that the example safety system 12 is to be deactivated, the deck position adjustor 1406 of the illustrated example operates the deck 30 based on the received command from block 1502 (block 1514).

If the deck position detector 1402 of the illustrated example detects that the example deck 30 is in the upright position, the deck position detector 1402 communicates the position of the example deck 30 to the safety system activator 1404, which activates the example safety system 12 of FIGS. 1-13 (block 1506).

When the safety system activator 1404 of the illustrated example activates the example safety system 12 (block 1506), the safety system activator 1404 monitors the example sensed region 56, 68, 68', 74, 78, 84, 90, 94 of the example safety system 12 (block 1508). For example, the safety system activator 1404 of the illustrated example receives signals from the example sensors 54, 66, 70, 76 and 80 when monitoring the sensed region 56, 68, 68', 74, 78, 84, 90, 94 of the example pit 26, 26'.

The safety system activator 1404 of the illustrated example determines if a body 50 is present in the example sensed region 56, 68, 68', 74, 78, 84, 90, 94 (block 1510). If the safety system activator 1404 of the illustrated example determines that a body 50 is not present within the example sensed region 56, 68, 68', 74, 78, 84, 90, 94, then the example safety system activator 1404 commands the deck position adjustor 1406 to operate (and/or continues operating) the deck 30 based on the command received in block 1502 (block 1514).

If the safety system activator 1404 of the illustrated example determines that a body 50 is present within the sensed region 56, 68, 68', 74, 78, 84, 90, 94, then the safety system activator 1404 commands the deck position adjustor 1406 to enter a state of restricted movement (block 1516). For example, the deck position adjustor 1406 of the illustrated example stops the operation and/or holds a position of the example deck 30 at a position at which the example safety system activator 1404 received or processed the example reaction signal 60. In some examples, the deck position adjustor 1406 of the illustrated example causes the deck actuator 48 to extend to move the example deck 30 toward the upright position upon entry into the state of restricted movement.

Figure 16:
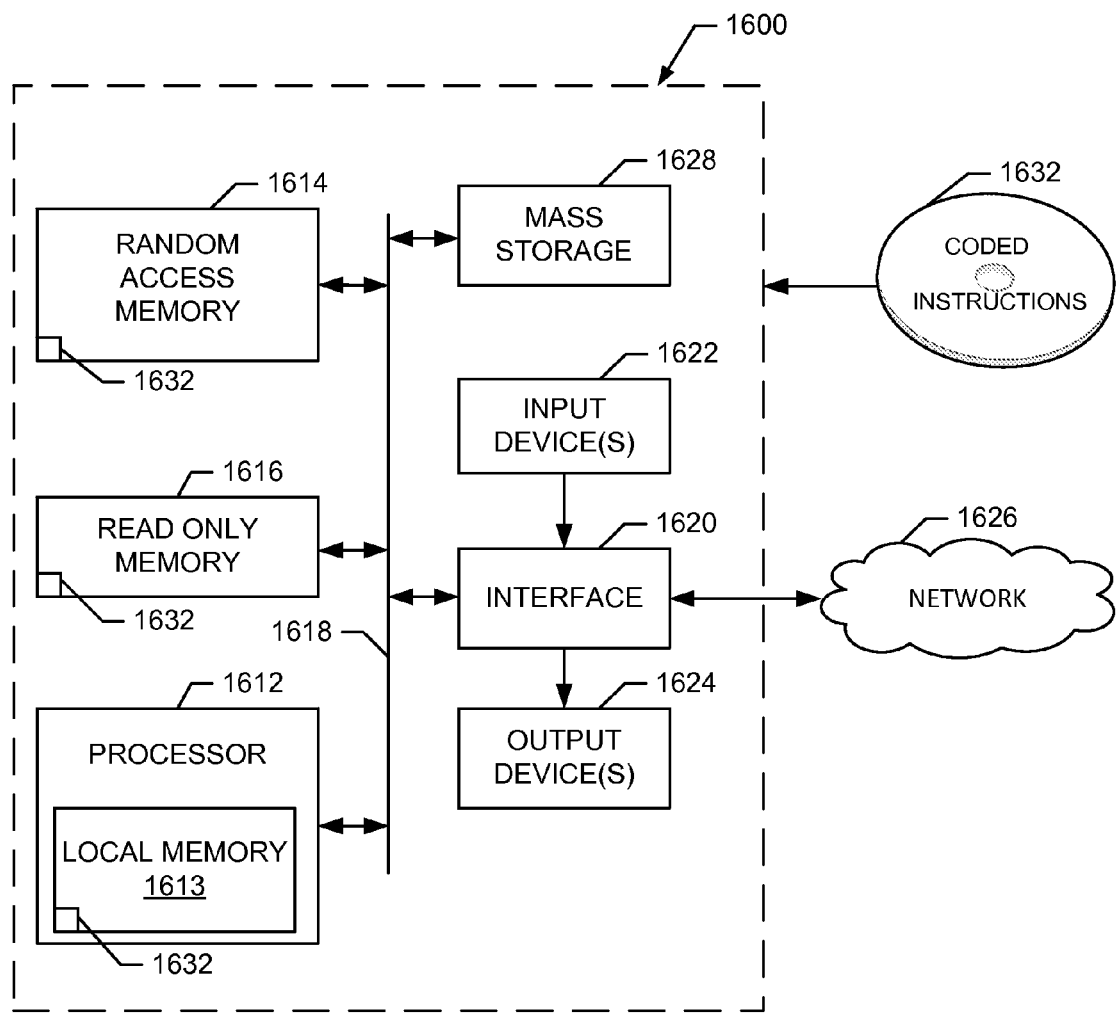
FIG. 16 is a block diagram of an example processor platform capable of executing the instructions of FIG. 15 to implement the example controller of FIG. 14.

FIG. 16 is a block diagram of an example processor platform 1600 capable of executing the instructions of FIG. 15 to implement the apparatus or controller 58 of FIG. 14. The processor platform 1600 can be, for example, a server, a personal computer, a mobile device (e.g., a cell phone, a smart phone, a tablet such as an iPad™), a personal digital assistant (PDA), an Internet appliance, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, and digital versatile disk (DVD) drives.

The coded instructions 1632 of FIG. 15 may be stored in the mass storage device 1628, in the volatile memory 1614, in the non-volatile memory 1616, and/or on a removable tangible computer readable storage medium such as a CD or DVD.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A dock leveler safety system for use at a dock platform in a pit having a pit floor, the pit floor being at a lower elevation than the dock platform, the dock platform and the pit floor defining the pit, the dock leveler safety system comprising:
 a deck to pivot relative to the dock platform between an upright position and a lowered position, the deck extending farther over the pit floor when the deck is in the lowered position than when the deck is in the upright position; and
 a sensor to monitor a sensed region within the pit when the deck is in the upright position, the sensor to provide a reaction signal in response to a body being detected within the sensed region prior to moving the deck toward the lowered position and without the deck having to approach the body, the deck to enter a state of restricted movement in response only to the reaction signal provided by the sensor.

2. The dock leveler safety system of claim 1, wherein the sensor is to project a beam projected at least partially through the pit.

3. The dock leveler safety system of claim 1, wherein the sensor comprises a pressure sensitive mat overlying at least a portion of the pit floor.

4. The dock leveler safety system of claim 1, wherein the sensor comprises an induction loop proximate the pit.

5. The dock leveler safety system of claim 1, wherein the sensor comprises a motion detector attached to the deck.

6. The dock leveler safety system of claim 1, wherein the sensor comprises a motion detector mounted to a structure that remains substantially stationary relative to the dock platform as the deck moves between the upright position and the lowered position.

7. The dock leveler safety system of claim 1, wherein the sensor comprises a body sensor attached to the deck.

8. The dock leveler safety system of claim 1, further comprising a processor to cause the sensor system to monitor the sensed region prior to receiving an input to move the deck toward the lowered position.

9. The dock leveler safety system of claim 1, wherein the sensed region remains substantially stationary as the deck moves between the upright position and the lowered position.

10. The dock leveler safety system of claim 1, wherein an area of the sensed region changes in size as the deck moves between the upright position and the lowered position.

11. The dock leveler safety system of claim 1, wherein movement of the deck is disabled when the deck is in the state of restricted movement.

12. The dock leveler safety system of claim 1, wherein downward movement of the deck is disabled when the deck is in the state of restricted movement, and an upward movement of the deck is enabled when the deck is in the state of restricted movement.

13. The dock leveler safety system of claim 1, wherein the deck enters the state of restricted movement in response to the detection of reaction signal while the deck is in the upright position.

14. The dock leveler safety system of claim 1, further comprising an alarm to emit an alarm signal in response to the reaction signal.

15. The dock leveler safety system of claim 14, wherein the alarm signal is audible.

16. The dock leveler safety system of claim 14, wherein the alarm signal is visual.

17. The dock leveler safety system of claim 1, wherein the sensed region is not only within the pit when the deck is in the upright position, but the sensed region is also within the pit when the deck is in the lowered position.

18. The dock leveler safety system of claim 1, wherein the lowered position is within a range of operative positions, the deck to enter the state of restricted movement in response to detection of the reaction signal while a position of the deck is outside of the range of operative positions, and the deck to enter a state of normal operation when a position of the deck is within the operative range.

19. A dock leveler safety system for use at a dock platform in a pit having a pit floor, the pit floor being at a lower elevation than the dock platform, the dock platform and the pit floor defining the pit, the dock leveler safety system comprising:
a deck to pivot relative to the dock platform between an upright position and a lowered position, the deck extending farther over the pit floor when the deck is in the lowered position than when the deck is in the upright position; and
a first sensor and a second sensor to monitor a sensed region within the pit when the deck is in the upright position, the at least one of the first sensor or the second sensor to provide independently a reaction signal in response to a body being detected by the at least one of the first sensor or the second sensor within the sensed region prior to moving the deck toward the lowered position, the deck to enter a state of restricted movement in response only to the reaction signal provided by the at least the first sensor or the sensor signal, wherein each of the first and second sensors comprises a body sensor mounted to a structure that remains substantially stationary relative to the dock platform as the deck moves between the upright position and the lowered position.

20. A dock leveler safety system comprising:
a dock platform;
a pit floor being at a lower elevation than the dock platform, the dock platform and the pit floor defining a pit;
a deck to pivot relative to the dock platform between a stored upright position and a lowered position, the deck extending farther into the pit and over the pit floor when the deck is in the lowered position than when the deck is in the stored upright position; and
a sensor system having a sensed region within the pit when the deck is in the stored upright position, the sensed region covering substantially an entire area of the pit floor, the sensed region being stationary relative to the dock platform as the deck moves between the stored upright position and the lowered position, the sensor system providing a reaction signal in response to a body being detected within the sensed region, the sensor system to detect the body within the sensed region without the deck having to approach the body, the deck being in a state of restricted movement in response to the sensor system providing only the reaction signal indicative of a presence of the body in the sensed region while the deck is in the stored upright position.

21. The dock leveler safety system of claim 20, wherein the sensor system includes a beam projected at least partially through the pit.

22. A dock leveler safety system comprising:
a dock platform;
a pit floor being at a lower elevation than the dock platform, the dock platform and the pit floor defining a pit;
a deck to pivot relative to the dock platform between a stored upright position and a lowered position, the deck extending farther into the pit when the deck is in the lowered position than when the deck is in the stored upright position, the deck extending farther over the pit floor when the deck is in the lowered position than when the deck is in the stored upright position; and
a sensor system having a sensed region within the pit when the deck is in the stored upright position, an area defining the sensed region decreases as the deck moves from the stored upright position to the lowered position, solely the sensor system providing a reaction signal in response to a body being detected within the sensed region, the sensor system to sense the body without the deck having to approach the body and while the deck is in the upright position, the deck being in a state of restricted movement in response to the sensor system sensing the body in the sensed region and providing the reaction signal while the deck is in the stored upright position and prior to the deck moving toward the lowered position.

23. The dock leveler safety system of claim 22, wherein the sensor system includes a motion detector attached to the deck.

* * * * *